W. C. FISHER.
WOVEN ENDLESS BELT.
APPLICATION FILED JUNE 28, 1916.
1,203,189.
Patented Oct. 31, 1916.
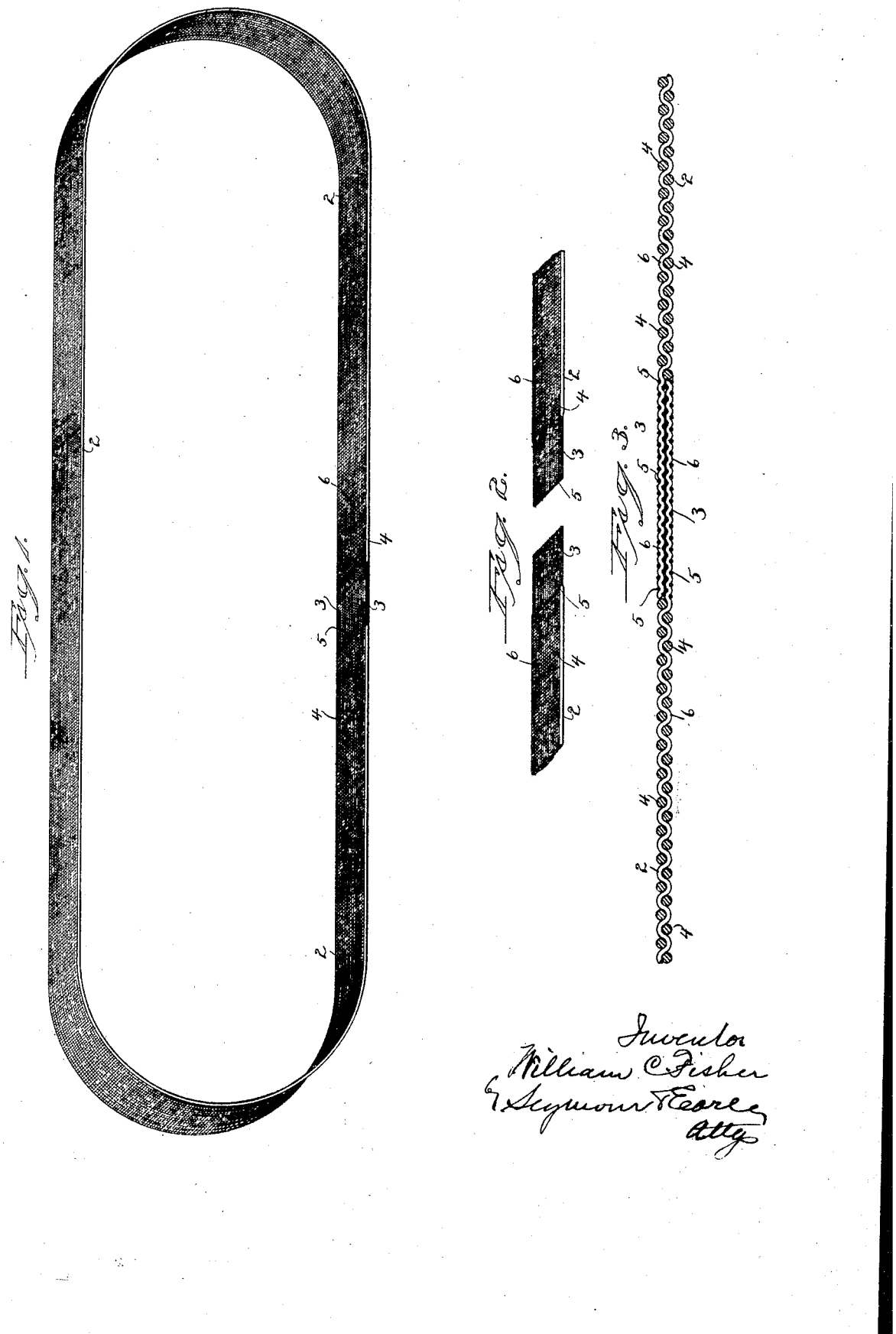

UNITED STATES PATENT OFFICE.

WILLIAM C. FISHER, OF MIDDLETOWN, CONNECTICUT, ASSIGNOR TO RUSSELL MFG. CO., OF MIDDLETOWN, CONNECTICUT, A CORPORATION.

WOVEN ENDLESS BELT.

1,203,189.

Specification of Letters Patent.

Patented Oct. 31, 1916.

Application filed June 28, 1916. Serial No. 106,340.

*To all whom it may concern:*

Be it known that I, WILLIAM C. FISHER, a citizen of the United States, residing at Middletown, in the county of Middlesex and State of Connecticut, have invented a new and useful Improvement in Woven Endless Belts; and I do hereby declare the following, when taken in connection with the accompanying drawings and the characters of reference marked thereon, to be a full, clear, and exact description of the same, and which said drawings constitute part of this application, and represent, in—

Figure 1 a perspective view of a woven endless belt made in accordance with my invention. Fig. 2 a broken perspective view showing the ends of the belt-length. Fig. 3 a broken schematic view showing the ends of the belt as coupled together.

My invention relates to an improvement in woven endless belts for power-transmission and kindred uses, the object being to weave such belts with special integral fastening-ends adapted to be secured together without appreciably thickening the belt at the point of fastening or making it less pliable there than elsewhere.

With these ends in view, my invention consists in a woven endless belt having certain details of construction as will be hereinafter described and pointed out in the claim.

In carrying out my invention, as herein shown, the belt-lengths are woven of a predetermined length according to the size of the belt to be produced. The loom, moreover, is set so as to produce at each end of each belt-length 2, a special fastening-end 3 corresponding in width to the belt fabric but substantially half the thickness thereof. This result is produced by changing the size of the filling threads, at the point where it is desired to begin to reduce the thickness of the fabric, from the ordinary filling thread 4 to a much smaller filling thread 5, the warp threads 6 remaining the same. The special filling threads 5 are so chosen in size with reference to the size of the filling threads 4, that the fastening-ends 3 will be substantially half the thickness of the main body of the belt-fabric. Then when the fastening-ends 3 are overlaid upon each other, the two ends will together form a thickness substantially equal to the thickness of the main body of the belt. Preferably the fastening-ends 3 will be secured together by an adhesive, but they may be stitched, if desired, the mode of fastening them together being no part of my present invention.

I claim:—

A woven endless belt characterized by having woven integral fastening-ends each of substantially half the thickness of the body-portion of the belt, the filling threads of the said fastening-ends being smaller than the filling threads of the main portion of the belt, and the warp-threads of the said fastening-ends being continuations of the warp-threads of the main portion of the belt, and the said fastening-ends being overlapped and secured together, whereby the joint of the belt is of substantially the same thickness and pliability as the main portion of the belt.

WILLIAM C. FISHER.